US012384060B2

(12) United States Patent
Lee et al.

(10) Patent No.: US 12,384,060 B2
(45) Date of Patent: Aug. 12, 2025

(54) ROBOT SAFETY MONITORING SYSTEM

(71) Applicant: HANWHA ROBOTICS CORPORATION, Seongnam-si (KR)

(72) Inventors: Tae Hwan Lee, Seoul (KR); Hyun Jin Lee, Seoul (KR); Jun Yeong Kim, Seoul (KR); Ji Woong Shin, Seoul (KR); Seung Hwan Lee, Seoul (KR)

(73) Assignee: HANWHA ROBOTICS CORPORATION, Seongnam-si (KR)

( * ) Notice: Subject to any disclaimer, the term of this patent is extended or adjusted under 35 U.S.C. 154(b) by 291 days.

(21) Appl. No.: 17/971,097

(22) Filed: Oct. 21, 2022

(65) Prior Publication Data
US 2023/0131396 A1    Apr. 27, 2023

(30) Foreign Application Priority Data
Oct. 22, 2021 (KR) .................... 10-2021-0141640

(51) Int. Cl.
*B25J 19/06* (2006.01)
*B25J 9/16* (2006.01)
*B25J 19/02* (2006.01)

(52) U.S. Cl.
CPC .............. *B25J 19/06* (2013.01); *B25J 9/1676* (2013.01); *B25J 9/1697* (2013.01); *B25J 19/023* (2013.01)

(58) Field of Classification Search
CPC ........ B25J 19/06; B25J 19/023; B25J 9/1676; B25J 9/1697; B25J 11/002; B25J 13/08;
(Continued)

(56) References Cited

U.S. PATENT DOCUMENTS

2015/0217455 A1   8/2015  Kikkeri et al.
2017/0054918 A1*  2/2017  Chern ................ G01S 17/86
(Continued)

FOREIGN PATENT DOCUMENTS

JP    2004243215 A  *  9/2004
WO    2021/059695 A1    4/2021

OTHER PUBLICATIONS

Trong Phuc Truong et al., "Semi-independent Stereo Visual Odometry for Different Field of View Cameras", European Conference on Computer Vision (ECCV), Jan. 23, 2019, pp. 430-442, XP047645853.
(Continued)

*Primary Examiner* — Abby Y Lin
*Assistant Examiner* — Kayla R Doros
(74) *Attorney, Agent, or Firm* — Sughrue Mion, PLLC

(57) ABSTRACT

A robot safety monitoring system includes a stereo camera set configured to photograph a robot and a monitoring area around the robot and a processor connected to the stereo camera set. The stereo camera set includes a first camera including a plurality of first camera modules spaced apart from each other, and a second camera including a plurality of second camera modules spaced apart from each other. Based on a first direction, the first camera and the second camera have different fields of view. The processor is configured to set the monitoring area, determine whether an object is present in the monitoring area, and control the robot based on determining that an object is present in the monitoring area.

19 Claims, 10 Drawing Sheets

(58) Field of Classification Search
CPC .................. B25J 9/1674; B25J 9/1666; G05B 2219/40607; G05B 2219/37567; H04N 23/00; H04N 13/204; H04N 2013/0081; F16P 3/142; G06T 2207/10028; G06T 2207/10021; G06T 1/0014; G06T 2207/10012; G06T 2207/30232; G06T 7/0008; G06T 7/70; G01S 17/04; Y10S 901/47; G06V 20/52

See application file for complete search history.

(56) References Cited

U.S. PATENT DOCUMENTS

| | | | |
|---|---|---|---|
| 2017/0359565 A1* | 12/2017 | Ito | H04N 13/282 |
| 2019/0377322 A1* | 12/2019 | Hornung | G06T 7/80 |
| 2020/0213574 A1* | 7/2020 | Yamazaki | H04N 13/25 |
| 2021/0190917 A1* | 6/2021 | Matsuura | G01S 17/87 |
| 2021/0260770 A1* | 8/2021 | Vu | G01S 17/88 |

OTHER PUBLICATIONS

Extended European Search Report issued by the European Patent Office on Mar. 2, 2023 in European Patent Application No. 22202884.7.

* cited by examiner

ROBOT SAFETY MONITORING SYSTEM

CROSS-REFERENCE TO RELATED APPLICATION

This application is based on and claims priority under 35 U.S.C. § 119 to Korean Patent Application No. 10-2021-0141640, filed on Oct. 22, 2021, in the Korean Intellectual Property Office, the disclosure of which is incorporated by reference herein in its entirety.

BACKGROUND

1. Field

One or more embodiments relate to safety monitoring equipment using a stereo camera, and more particularly, to a robot safety monitoring system for controlling mechanical equipment in a dangerous situation after detecting an abnormal approach of a person or an object to the mechanical equipment.

2. Description of Related Art

As safety in industrial sites becomes more important, the need for monitoring equipment using sensors and cameras has increased. Such monitoring equipment may include a system that detects and monitors whether a person or any object enters a hazardous area by using a sensor and a camera installed around mechanical equipment.

A method using a line sensor is more frequently used in a space with an entrance than in an open space. In general, in this method, when a line sensor is installed at an entrance and a person passes through the entrance, the mechanical equipment is stopped. Thus, this method is cost effective, but there is a limitation in usage in open spaces.

A method using a light detection and ranging (LIDAR) sensor may be used. In general, in this method, monitoring is performed while rotating a line sensor in a certain angle range. In this method, a monitoring speed is determined according to a rotation speed, and detection is possible only in a two-dimensional (2D) plane rather than a three-dimensional (3D) space.

Finally, there is a method using a 3D camera, which is the most useful method because data about a 3D space can be obtained. However, a Time of Flight (TOF) camera is sensitive to the surrounding brightness and has a narrow field of view (FOV).

Existing stereo cameras are inexpensive and have a wide FOV, but provide poor detection performance with respect to objects parallel to the baselines of the stereo cameras.

FIG. 1 is a diagram for explaining an FOV. Referring to FIG. 1, an FOV refers to a shooting range of a camera. As shown in FIG. 1, the FOV may include a vertical FOV, a horizontal FOV, and a diagonal FOV. An imaging area may be defined by the vertical FOV, the horizontal FOV, and the diagonal FOV. An angle corresponding to half the FOV may be referred to as half-of-FOV (HFOV).

FIG. 2 is a diagram showing the structure of a related art stereo camera. FIG. 3 shows distance information when the same subject is photographed with a related art stereo camera. FIG. 4 shows a one-to-one matching result according to a pattern during stereo matching through a related art stereo camera.

Referring to FIG. 2, depth information may be obtained using two images 4 and 5 obtained after photographing a subject 3 through two cameras 1 and 2, respectively.

Referring to FIG. 3, when the same subject is photographed, the locations of the subject shown on a left image 8 and a right image 9 have the same height along an epipolar line, and only locations thereof in a horizontal direction are different from each other. To obtain the depth information, stereo matching is performed along the epipolar line. After finding the same portion from the left image 8 and the right image 9, the depth information is obtained using a disparity 10 between the locations. In this case, it may be determined that the smaller the location disparity, the greater the depth, and the larger the location disparity, the closer the distance.

However, this stereo matching has a structural disadvantage. Because a scan is performed in a parallel direction along the epipolar line, detection of the distance information for a pattern in a direction parallel to the epipolar line is weak.

FIG. 4 explains this disadvantage in detail. It may be seen from the upper images 11 and 12 of FIG. 4 that, in the case of a vertical pattern, when a right image 12 is scanned along the epipolar line 13 in order to find the same block as a solid block in a left image 11, the same solid block is one.

In this case, a result is reliable because one-to-one matching is established. On the other hand, in the case of a horizontal pattern in the lower images 14 and 15 of FIG. 4, several blocks that are the same as the solid block in the left image 14 exist as viewed along the epipolar line 13 of the right image 15. Thus, one-to-one matching is not established, and thus, a result of stereo matching is unreliable. In this case, because an epipolar line 7 of FIG. 2 is parallel to a baseline 6 of the stereo camera, when the subject 3 is placed parallel to the baseline 6 or a pattern is parallel to the base line 6, a method using the related art stereo camera may have degraded detection performance.

SUMMARY

Provided is a robot safety monitoring system having a more stable detection performance by vertically arranging two cameras.

However, these embodiments are exemplary, and embodiments of the present disclosure are not limited thereto.

Additional aspects will be set forth in part in the description which follows and, in part, will be apparent from the description, or may be learned by practice of the presented embodiments of the disclosure.

According to an aspect of the disclosure, a robot safety monitoring system may include a stereo camera set configured to photograph a robot and a monitoring area around the robot and a processor connected to the stereo camera set. The stereo camera set may include a first camera including a plurality of first camera modules spaced apart from each other, and a second camera including a plurality of second camera modules spaced apart from each other. Based on a first direction, the first camera and the second camera have different fields of view. The processor may be configured to set the monitoring area, determine whether an object is present in the monitoring area, and control the robot based on determining that an object is present in the monitoring area.

The plurality of first camera modules and the plurality of second camera modules may have the same diagonal fields of view.

The plurality of first camera modules may be arranged in a second direction, and the plurality of second camera modules may be arranged in a third direction perpendicular to the second direction.

A first interval between the plurality of first camera modules may be greater than a second interval between one of the plurality of first camera modules and one of the plurality of second camera modules that is closest to the one of the plurality of first camera modules.

The second interval may be about 50% to about 95% of the first interval.

The plurality of first camera modules and the plurality of second camera modules may have the same horizontal fields of view and the same vertical fields of view.

The horizontal fields of view may be about 1.2 times to about 3 times the vertical fields of view.

The processor may include an image processor configured to match images obtained by the plurality of first camera modules and the plurality of second camera modules and obtain detection information of an object based on a result of the matching, and a robot controller configured to determine a presence or an absence of an object in the monitoring area, and control the robot.

The stereo camera set may be provided above the robot in a direction facing the robot.

The monitoring area may include a warning area, a danger area, and an object area.

The warning area may include the danger area and the object area, and, based on an object being present in an area other than the object area among the warning area, the processor may be further configured to decrease a driving speed of the robot.

The warning area may include the danger area and the object area, and based on an object being present in an area other than the object area, the processor may be further configured to stop the robot from moving.

The first camera and the second camera may be arranged to cross each other.

According to an aspect of the disclosure, a robot safety monitoring method may include setting a robot and a monitoring area around the robot, determining, by a stereo camera set, a presence or an absence of an object in the monitoring area, and controlling the robot according to the presence or the absence of an object. The stereo camera set may include a first camera including a plurality of first camera modules spaced apart from each other and a second camera including a plurality of second camera modules spaced apart from each other. Based on a first direction, the first camera and the second camera may have different fields of view, and the plurality of first camera modules and the plurality of second camera modules may have the same diagonal fields of view.

The monitoring area may include a warning area, a danger area, and an object area, and the method may include setting, modifying and deleting each of the warning area, the danger area, and the object area.

The method may include, prior to the determining of the presence or the absence of an object, matching images obtained through the stereo camera set and obtaining detection information of an object based on a result of the matching.

According to an aspect of the disclosure, a robot safety monitoring system may include a stereo camera set including a first camera and a second camera, the stereo camera set being configured to photograph a robot and a monitoring area corresponding to the robot, and a processor configured to set the monitoring area, determine whether an object is present in the monitoring area, and control the robot based on determining that an object is present in the monitoring area. The first camera may include a plurality of first camera modules, and the second camera may include a plurality of second camera modules.

The first camera and the second camera may have different fields of view in a first direction.

The processor may be configured to match images obtained by the plurality of first camera and the second camera, obtain detection information of an object based on a result of the matching, and control the robot based on the detection information.

These and/or other aspects will become apparent and more readily appreciated from the following description of the embodiments, taken in conjunction with the accompanying drawings.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
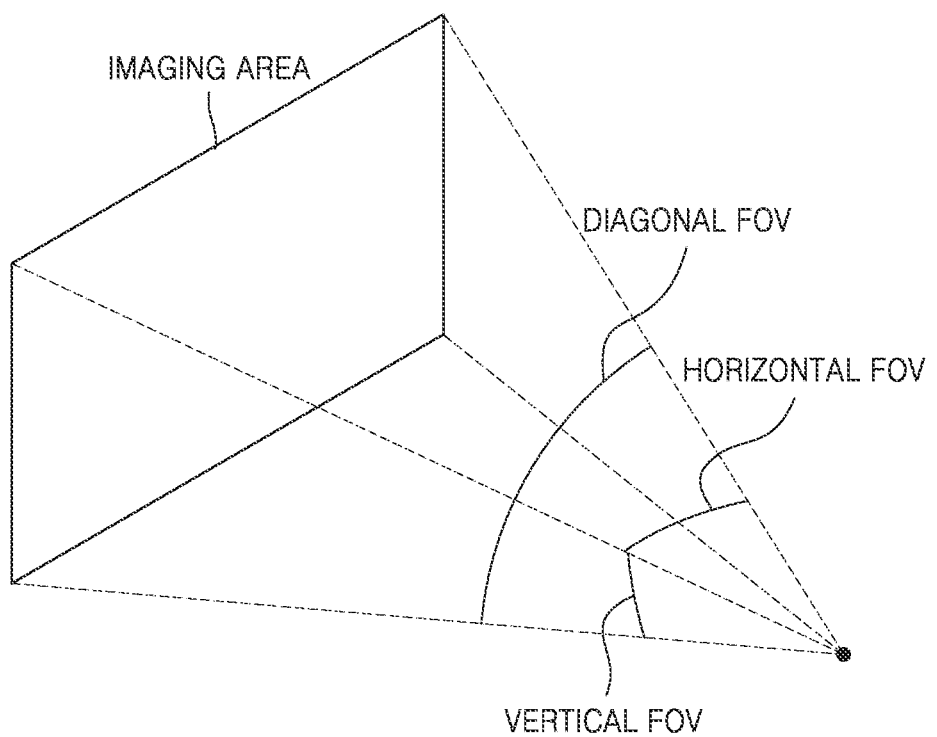
FIG. 1 is a diagram for explaining a field of view (FOV)
Figure 2:
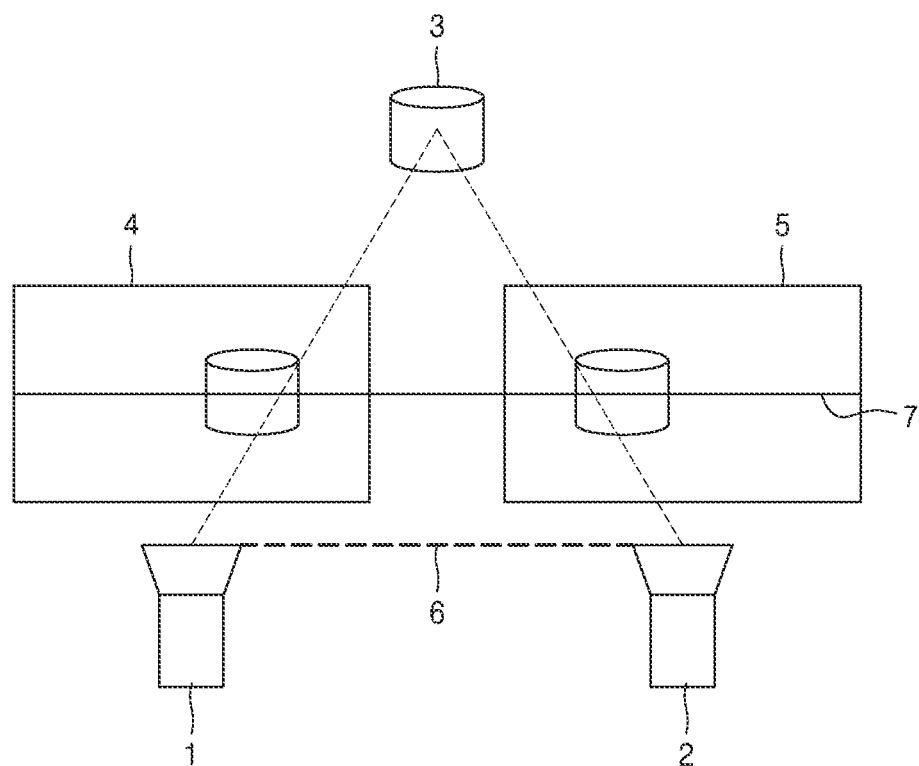
FIG. 2 is a diagram showing the structure of a related art stereo camera.
Figure 3:
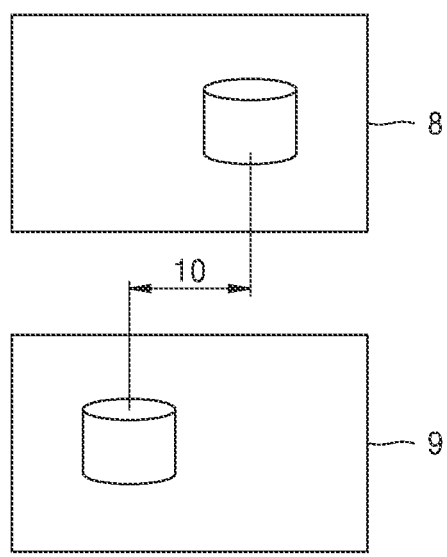
FIG. 3 shows distance information when the same subject is photographed with a related art stereo camera.
Figure 4:
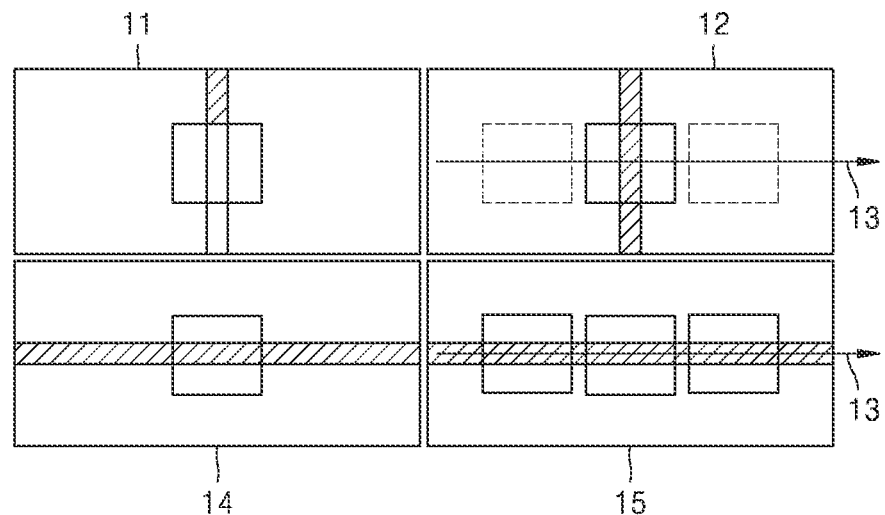
FIG. 4 shows a one-to-one matching result according to a pattern during stereo matching through a related art stereo camera.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "one or more of," when preceding a list of elements, modify the entire list of elements and do not modify the individual elements of the list.

As the disclosure allows for various changes and numerous embodiments, particular embodiments will be illustrated in the drawings and described in detail in the written description. However, this is not intended to limit the disclosure to particular embodiments, and it is to be appreciated that all changes, equivalents, and substitutes that do not depart from the spirit and technical scope of the disclosure are encompassed in the disclosure. In the description of the disclosure, even though shown in other embodiments, the same reference characters or numerals are used for the same components.

Hereinafter, the disclosure will be described in detail by explaining exemplary embodiments of the disclosure with reference to the attached drawings. Like reference numerals in the drawings denote like components, and thus their description will be omitted.

It will be understood that although the terms "first," "second," etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

Sizes of components in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

The terms used in the present specification are merely used to describe particular embodiments, and are not intended to limit the disclosure. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

A stereo camera set according to an embodiment will now be described with reference to FIGS. 5 through 8.

Figure 5:
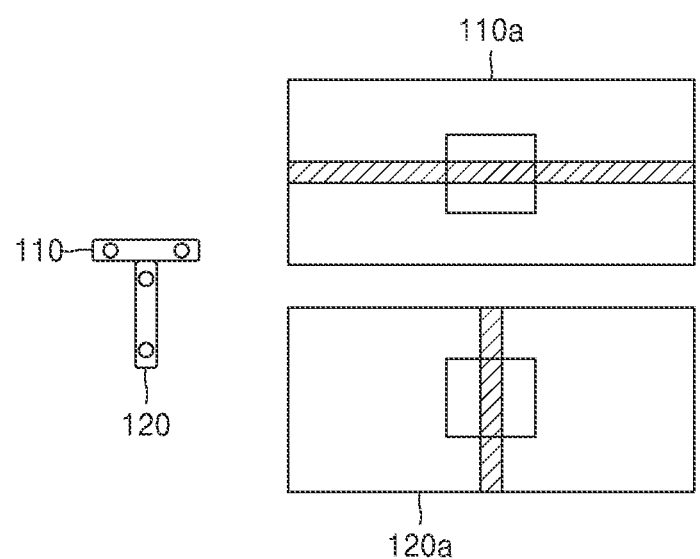
FIG. 5 is a diagram illustrating an arrangement of two cameras in a T shape according to an embodiment.
Figure 6:
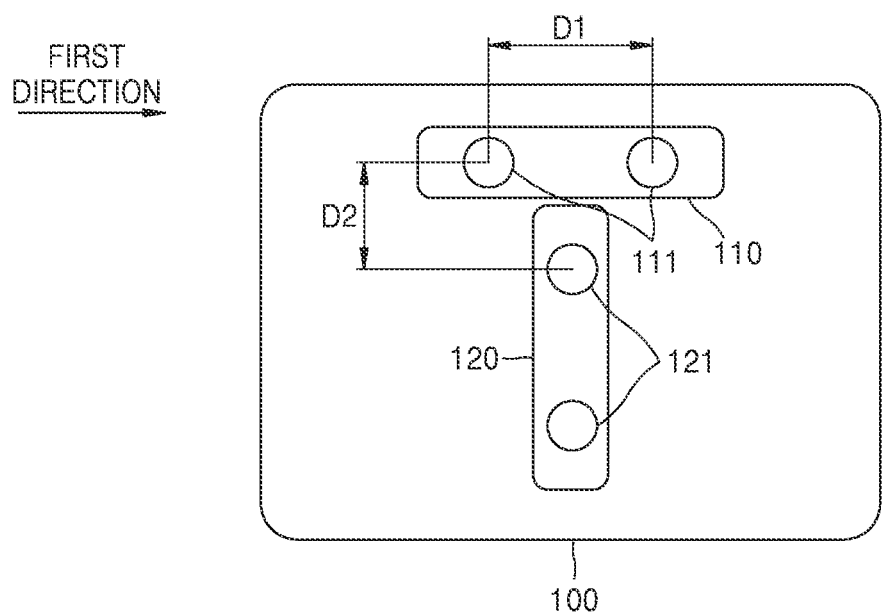
FIG. 6 is a diagram illustrating a detailed arrangement of a stereo camera set according to an embodiment.
Figure 7:
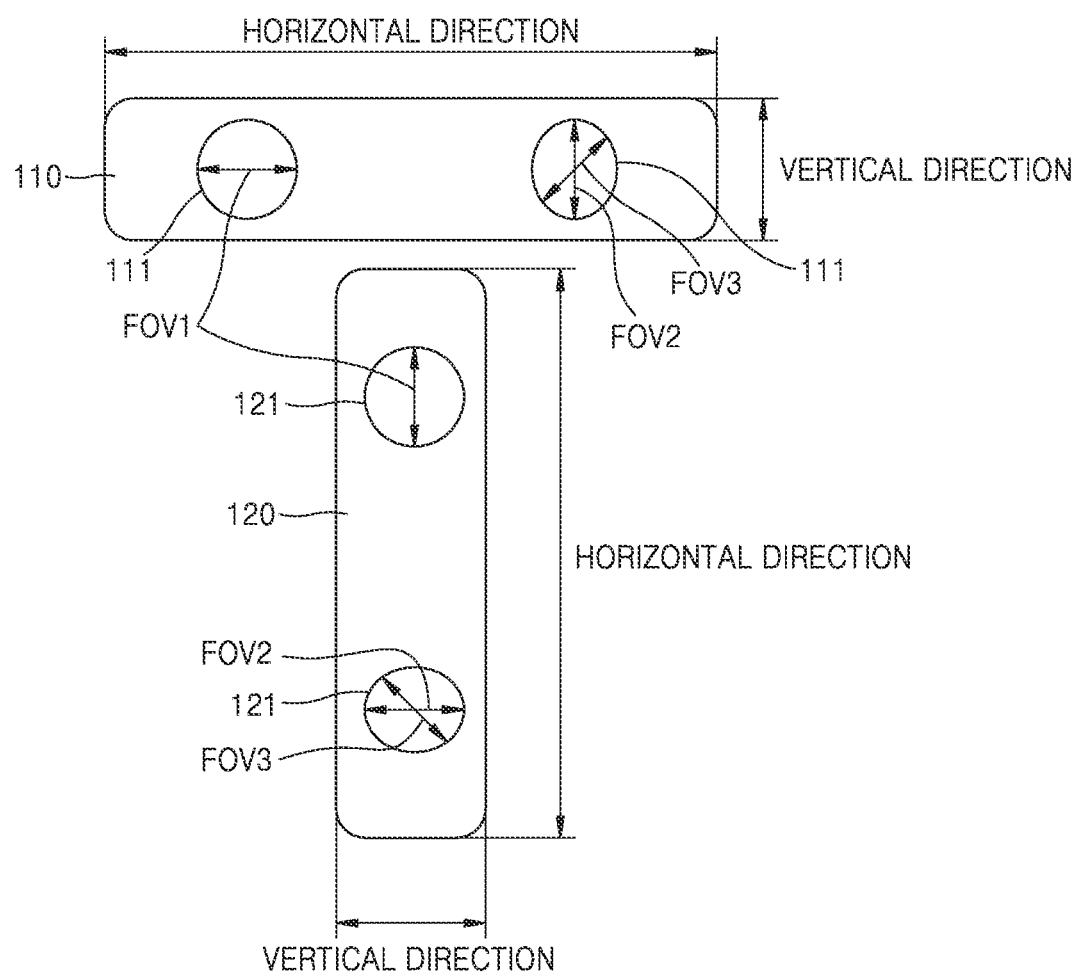
FIG. 7 is a diagram illustrating an FOV of a camera module according to an embodiment.
Figure 8:
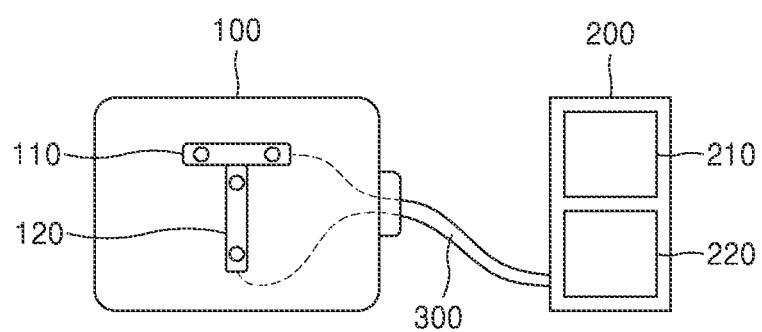
FIG. 8 is a diagram illustrating connection of a stereo camera set to a processor according to an embodiment.

FIG. 5 is a diagram illustrating an arrangement of two cameras in a T shape according to an embodiment. FIG. 6 is a diagram illustrating a detailed arrangement of a stereo camera set according to an embodiment. FIG. 7 is a diagram illustrating a field of view (FOV) of a camera module according to an embodiment. FIG. 8 is a diagram illustrating connection of a stereo camera set to a processor according to an embodiment.

FIGS. 5 through 8, a robot safety monitoring system according to an embodiment includes a stereo camera set 100 for photographing a robot and a monitoring area around the robot, and a processor 200 connected to the stereo camera set 100. The processor 200 sets the monitoring area, determines whether an object exists in the monitoring area, and controls the robot when an object exists in the monitoring area.

The stereo camera set 100 may include a first camera 110 and a second camera 120 disposed perpendicular to the first camera 110. Referring to FIGS. 5 and 6, because the stereo camera set 100 has a T shaped configuration in which the first camera 110 is disposed to extend in a first direction and the second camera 120 is disposed to extend a direction perpendicular to the first direction, any one of the two cameras obtains a pattern that is not parallel to a baseline even in any situation. Thus, a situation where there is no one-to-one matching at a specific angle does not occur. Therefore, the reliability of a stereo matching result may be improved, and the detection performance of an object using the stereo camera may be maintained more stably. In addition, the stereo camera set 100 includes the first and second cameras 110 and 120 arranged in a T shape, and, when any one of the first and second cameras 110 and 120 is damaged, the first and second cameras 110 and 120 may be selectively replaced rather than being entirely replaced, and thus repair and replacement may be easy and economical efficiency may be improved.

Referring to FIG. 6, the stereo camera set 100 according to an embodiment includes a first camera 110 including a plurality of first camera modules 111 spaced apart from each other, and a second camera 120 including a plurality of camera modules 121 second cameras spaced apart from each other. In this case, based on the first direction, the first and second cameras 110 and 120 have FOVs having different directions.

Because the first and second cameras 110 and 120 have FOVs in different directions, a situation in which one-to-one matching is not established at a specific angle does not occur, such that the reliability of the stereo matching result may be improved, and an object detection performance using the stereo camera may be kept more stably.

According to an embodiment, a first distance D1 between the first camera modules 111 may be greater than a second distance D2 between the first camera modules 111 and the second camera modules 121 closest to the first camera modules 111. When the first distance D1 is less than the second distance D2, an FOV of the first camera modules 111 and an FOV of the second camera modules 121 may overlap each other. Accordingly, by making the first distance D1 be larger than the second distance D2, a field of vision in a range where the FOVs of the camera modules do not overlap each other or are not away from each other may be secured.

According to an embodiment, the first distance D1 and the second distance D2 may maintain a preset ratio. In this case, the second distance D2 may be about 95% or less of the first distance D1. When the second distance D2 is greater than about 95% of the first distance D1, an ineffective area may be formed due to an increase in an interval between the cameras, and thus detection performance may be deteriorated. Accordingly, by designing the second distance D2 not to exceed 95% of the first distance D1, loss of a sensing area and deterioration of sensing performance may be prevented.

In more detail, the ratio may be set by being divided into three ranges. In a maximum allowable range, which is a first range, the second distance D2 may be about 95% or less of the first distance D1. The first range may be set as a threshold of loss of the sensing area and degradation of sensing performance.

In an appropriate allowable range, which is a second range, the second distance D2 may be about 85% or less of the first distance D1. When the camera modules are disposed within the appropriate allowable range, the sensing performance may be improved to the extent that the sensing area is not lost.

In a highest appropriate allowable range, which is third range, the second distance D2 may be about 70% or less of the first distance D1. When the camera modules are disposed within the highest appropriate allowable range, the sensing performance may be maximized to the extent that the sensing area is not lost.

According to an embodiment, referring to FIG. 6, the first distance D1 may be about 50 mm, and the second distance D2 may be about 35 mm. In this case, the second distance D2 may be about 70% of the first distance D1. When the first distance D1 and the second distance D2 are arranged to have a ratio of the highest appropriate allowable range of about 70% as described above, the sensing area may not be lost, and still the sensing performance may be maximized.

Referring to FIG. 7, a horizontal FOV FOV1 and a vertical FOV FOV2 of the first and second camera modules 111 and 121 may be the same as each other. In other words, the horizontal FOV FOV1, the vertical FOV FOV2, and a diagonal FOV FOV3 of the first and second camera modules 111 and 121 are all the same as each other, but the second camera 120 may be disposed perpendicular to the first camera 110 while having the same FOV direction as the first camera 110.

According to an embodiment, the horizontal FOV FOV1 may be about 1 to 2 times the vertical FOV FOV2. When the horizontal FOV FOV1 is less than the vertical FOV FOV2, a circular sensing area is not formed around the robot R. Even when the horizontal FOV FOV1 is greater than twice the vertical FOV FOV2, a circular sensing area is not formed around the robot R.

Accordingly, in order to form the circular sensing area around the robot R, the horizontal FOV FOV1 may need to be about 1 to 2 times the vertical FOV FOV2.

In more detail, the ratio may be set by being divided into three ranges. In the maximum allowable range, which is a first range, the horizontal FOV FOV1 may be about 1 to 2 times the vertical FOV FOV2. The first range may be set as a threshold value for forming a sensing area in a circular shape around the robot R.

In a second range, the horizontal FOV FOV1 may be about 1.25 to 1.75 times the vertical FOV FOV2. In the second range, an object in the sensing area of the circular shape set about the robot R may be effectively sensed.

In a third range, the horizontal FOV FOV1 may be about 1.3 to 1.5 times the vertical FOV FOV2. In the third range, the sensing area may be provided more compactly, such that the sensing performance in the sensing area in a circular shape set around the robot R.

According to an embodiment, referring to FIG. 7, the horizontal FOV FOV1 may be about 70 degrees to about 100 degrees, and the vertical FOV FOV2 may be about 45 degrees to about 65 degrees. In detail, according to an embodiment, in order to reduce the loss of the sensing area set around the robot R, the horizontal FOV FOV1 may be about 70 degrees to about 90 degrees, and the vertical FOV FOV2 may be about 50 degrees to about 60 degrees. For example, according to an embodiment, the horizontal FOV FOV1 may be 85.2 degrees, and the vertical FOV FOV2 may be 58 degrees. In this case, the horizontal FOV FOV1 may be 1.468 times the vertical FOV FOV2. Due to this arrangement of the horizontal FOV FOV1 and the vertical FOV FOV2 in the third range of 1.468 times, the sensing area may be provided compactly, such that the sensing performance of the sensing area set around the robot R may be maximized.

Referring to FIG. 6, vertical and horizontal widths of the stereo camera set 100 may be the same as each other or different from each other. For example, a ratio between the vertical width and the horizontal width of the stereo camera set 100 may be about 0.8:1 to about 1.2:1. According to an embodiment, the vertical and horizontal widths of the stereo camera set 100 may be provided the same as each other to thereby have improved aesthetics. For example, the vertical width and the horizontal width of the stereo camera set 100 may be both 200 mm. Horizontal and vertical lengths of the first camera 110 may be different from each other. For example, the horizontal length of the first camera 110 may be greater than the vertical length thereof. In detail, the horizontal length of the first camera 110 may be about 2 to about 5 times the vertical length thereof. Preferably, the horizontal length of the first camera 110 may be about 2.5 to about 4 times the vertical length thereof. The vertical length of the second camera 120 may be greater than the horizontal length thereof. In detail, the vertical length of the second camera 120 may be about 2 to about 5 times the horizontal length thereof. The vertical length of the first camera 120 may be about 2.5 to about 4 times the horizontal length thereof. For example, according to an embodiment, the first camera 110 may be formed with a width of about 90 mm and a height of about 25 mm. The second camera 120 may be formed with a width of about 25 mm and a height of about 90 mm. Accordingly, according to an embodiment, the sensing performance in the sensing area set around the robot R may be maximized.

According to an embodiment, a process of matching two captured images may be needed for objects photographed through the first and second cameras 110 and 120 disposed perpendicular to each other such that the photographed objects appear as if photographed by a single camera.

In order to match images obtained from two cameras, as shown in FIG. 8, the two cameras may be connected to a processor 200 through a cable 300 and then may obtain frames at the same time. After that, two dimensional (2D) point matching or three dimensional (3D) point cloud matching may be used.

When the stereo camera matching is completed, the stereo camera set 100 including the first and second cameras 110 and 120 disposed perpendicular to each other is configured, and then the robot safety monitoring system shown in FIG. 8 may be configured. A robot safety monitoring equipment according to an embodiment may include the stereo camera set 100, the cable 300 connecting the stereo camera set 100 to the processor 200, and the processor 200.

According to an embodiment, the processor 200 may include an image processor 210 for matching the images obtained through the first and second cameras 110 and 120 and obtaining detection information of an object, based on a result of the matching, and a robot controller 220 for determining presence or absence of an object in a monitoring area and controlling the robot R. Based on this configuration, the processor 200 detects an object through an image and controls an operation of the robot R when an unintended object approaches the robot R such that the robot R may be prevented from operating in a dangerous environment and allowed to operate in a safe environment. Thus, a safer working environment may be provided to the operating robot R.

The processor 200 may enable data communication between the image processor 210 and the robot controller 220.

A robot safety monitoring system installed in a driving environment of the robot R and a monitoring area, according to an embodiment, will now be described with reference to FIG. 9. For contents not shown in FIG. 9, reference may be made to FIGS. 5 through 8.

Figure 9:
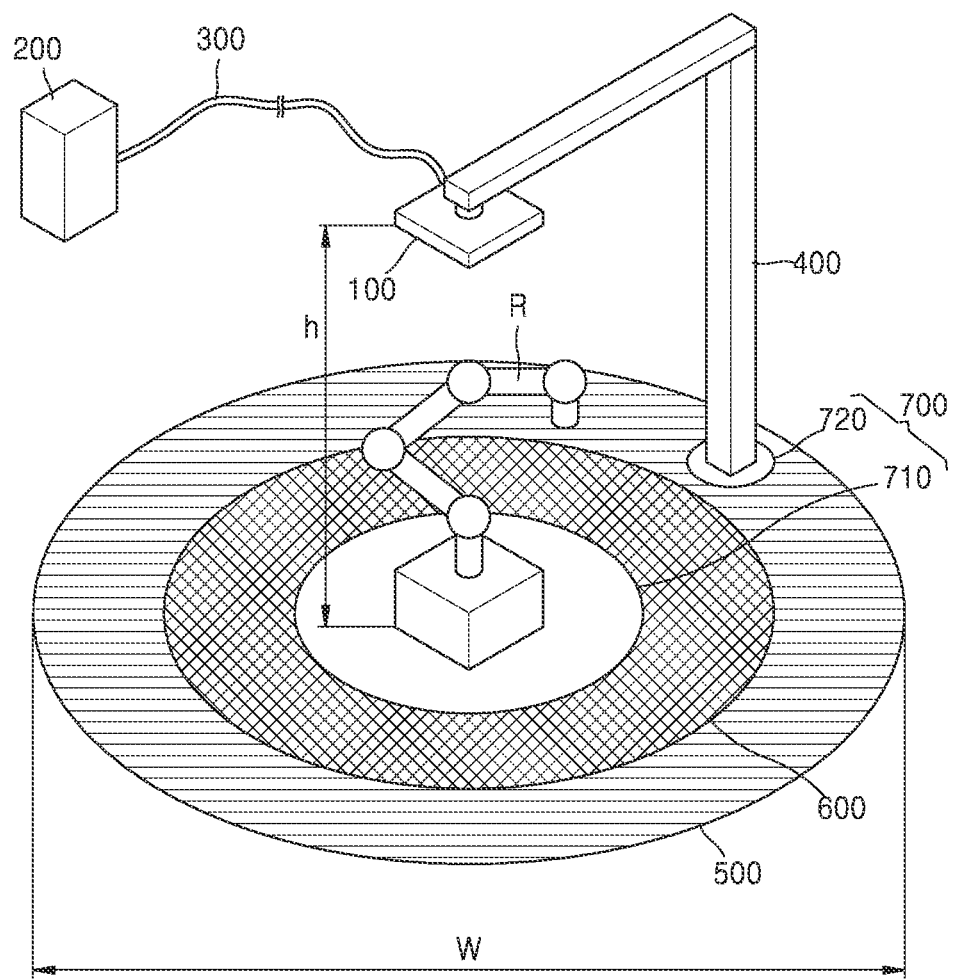
FIG. 9 is a diagram illustrating an arrangement of a robot safety monitoring system around a robot according to an embodiment.

FIG. 9 is a diagram illustrating an arrangement of a robot safety monitoring system around a robot according to an embodiment.

Referring to FIG. 9, in the robot safety monitoring system according to an embodiment, the stereo camera set 100 may be disposed over the robot R, and may be disposed in a direction facing the robot R. In this case, the robot safety monitoring system according to an embodiment may further include a height adjuster 400 for adjusting the arrangement height of the stereo camera set 100. According to the present embodiment, the height adjuster 400 may be a pillar. The stereo camera set 100 may be disposed on the ceiling irrespective of the height adjuster 400.

As such, the stereo camera set 100 may be installed at a position high enough to sufficiently monitor the surroundings of the robot R while looking at the robot R. Because a distance from the processor 200 increases as the stereo camera set 100 is installed higher, the length of the cable 300 may become sufficiently long to be connected to the stereo camera set 100.

According to an embodiment, a distance h to the floor on which the stereo camera set 100 and the robot R are disposed may be about 5 m or less, and a width w of the sensing area may be 5 m or less. When the distance h to the floor on which the stereo camera set 100 and the robot R are disposed and the width w of the sensing area deviate from the ranges of the distance and the width, the sensing area may not be set normally, and thus the sensing performance of an object may be deteriorated. When the robot R is disposed within the above range, the sensing performance of the stereo camera set 100 may be secured to a minimum. Preferably, the distance h to the floor on which the stereo camera set 100 and the robot R are disposed may be about 0.5 m to about 4 m, and the width w of the sensing area may be about 4 m or less. In this case, according to an embodiment, the sensing performance in the sensing area set around the robot R may be maximized.

The monitoring area according to an embodiment may include a warning area 500, a danger area 600, and an object area 700. Respective sizes of the warning area 500, the danger area 600, and the object area 700 are shown in FIG. 9.

In more detail, the warning area 500 includes the danger area 600 and the object area 700, and, when an object exists in the warning area 500 (e.g., in an area other than the object area 700), the processor 200 may slow down the driving speed of the robot R.

In this case, according to one or more embodiments, the robot safety monitoring system may further include an alarm unit connected to the processor 200 and generating a warning sound, and, when an object exists in the warning area 500 (e.g., in the area other than the object region 700), the alarm unit may generate the warning sound by the processor 200.

According to an embodiment, when an object exists in the danger area 600 (e.g., in an area other than the object area 700), the processor 200 may stop the robot R. In this case, the danger area 600 is included in the warning area 500 and may be narrower than the warning area 500. The size of the danger area 600 may be set to correspond to the size and speed of the robot R.

When the size of the robot R is relatively large, the size of the danger area 600 may also be relatively large. When the speed of the robot R is relatively high, the probability of problems in the work stability of the robot R due to an approach of an abnormal object is higher, such the size of the danger area 600 may also become larger than when the speed of the robot R is low.

When an object enters the warning area 500, the processor 200 may slow down the driving speed of the robot R to prepare for a dangerous situation in which an abnormal object exerts a physical force on the robot R. When an object crosses the warning area 500 and enters the danger area 600, which is an area closer to the robot R, the processor 200 may stop an operation of the robot R to more actively prepare for a dangerous situation.

The object area 700 may be included in the warning area 500 or the danger area 600. The object area 700 may be necessary to distinguish that the object is located differently from the warning area 500 or the danger area 600 when there is an object essential for driving and working of the robot R in the warning area 500 or in the danger area 600. In other words, unlike when an object is located inside the warning area 500 or the danger area 600, when an object is located inside the object area 700, deceleration and stoppage of the robot R and generation of a warning sound may not occur.

According to an embodiment, the object area 700 may include a first object area 710 including the robot R, and a second object area 720 including the height adjuster 400 for adjusting the height of the stereo camera set 100. In this case, the danger area 600 may include the first object area 710.

Referring to FIG. 9, the robot R is present in the danger area 600, and the height adjuster 400 for supporting the stereo camera set 100 and installing the stereo camera set 100 high is present in the warning area 500. However, in this case, an object is always sensed as being present in the danger area 600 and the warning area 500, and thus the robot R is unable to operate normally. In order to prevent this situation from happening, the robot R and the height adjuster 400 may be set as an object area, such that that the height adjuster 400 may prevent deceleration and stoppage of the robot R and generation of a warning sound.

Figure 10:
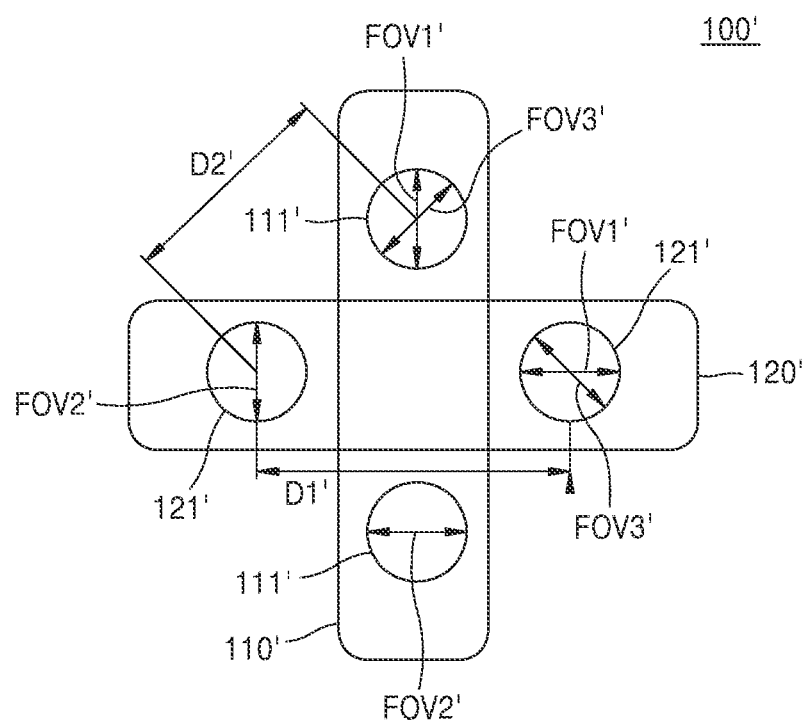
FIG. 10 is a diagram illustrating a stereo camera set according to an embodiment.

FIG. 10 is a diagram illustrating a stereo camera set 100' according to an embodiment. A stereo camera set according to another embodiment will now be described with reference to FIG. 10. For contents not described with reference to FIG. 10, in particular, contents of first and second distances D1' and D2' and FOVs FOV1', FOV2', and FOV3' may refer to the above-described contents.

Referring to FIG. 10, a first camera 110' and a second camera 120' of the stereo camera set 100' may be disposed to cross each other. In this case, a plurality of first camera modules 111' of the first camera 110' may be disposed to intersect a plurality of second camera modules 121' of the second camera 120'.

In this case, because the first and second cameras 110' and 120' have different FOVs, a situation in which one-to-one matching is not established at a specific angle does not occur, such that the reliability of the stereo matching result may be improved, and an object detection performance using the stereo camera may be kept more stably.

Compared to the T-shaped stereo camera set structure, a cross-type stereo camera set structure may be a structure in which the top, the bottom, the left, and the right are symmetrically arranged. Therefore, objects approaching in various directions may be equally sensed through the structure of the stereo camera set 100' arranged around the robot R, thereby improving sensing performance.

A robot safety monitoring method according to an embodiment will now be described.

The robot safety monitoring method according to an embodiment includes setting the robot R and the monitoring area around the robot R, determining presence or absence of an object in the monitoring area, and controlling the robot R according to the presence or absence of the object.

The monitoring area may include a warning area, a danger area, and an object area, each of which may be set, modified, and deleted. By allowing a user to set, modify, and delete each monitoring area, various operations of the robot R may be stably monitored through the setting, modification, and deletion of the monitoring area, and thus the robot R may more flexibly cope with changes in the working environment. An embodiment of the disclosure may include a computer program stored in a medium in order to set, modify, and delete each area using a computer device.

According to the present embodiment, the robot safety monitoring method may further include, before determining presence or absence of the object, matching an image obtained through the stereo camera set 100 and obtaining detection information of the object, based on a result of the matching.

The disclosure may include a computer program stored in a medium to set a monitoring area, determine presence or absence of an object, and control a robot. The computer program may execute the setting of the monitoring area, determination of presence or absence of the object, and control of the robot corresponding to the setting of the monitoring area and the determination of presence or absence of the object according to the computer program stored in the medium.

Specific technical contents described in the embodiment are embodiments, and do not limit the technical scope of the embodiment. In order to concisely and clearly describe the description of the disclosure, descriptions of conventional general techniques and configurations may be omitted. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential for application of the disclosure unless the item or component is specifically described as "essential" or "critical".

In the description and claims, "above" or similar referents may refer to both the singular and the plural unless otherwise specified. Furthermore, recitation of ranges of values herein are merely intended to serve as a shorthand method of referring individually to each separate value falling within the range, unless otherwise indicated herein, and each separate value is incorporated into the specification as if it were individually recited herein. The operations that constitute a method described herein can be performed in any suitable order unless otherwise indicated herein or otherwise clearly contradicted by context. Embodiments are not limited to the described order of the operations. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to one of ordinary skill in the art in accordance with design conditions and factors without departing from the spirit and scope of the disclosure.

Robot safety monitoring systems according to embodiments provide an effect capable of detecting an object regardless of what angle the object enters by vertically arranging two cameras in order to overcome structural limitations of a stereo camera.

In addition, the robot safety monitoring systems according to embodiments may provide sufficient robot safety monitoring to users with only a camera without installing a mechanical fence.

Moreover, because the robot safety monitoring systems according to embodiments do not utilize a mechanical fence, the robot safety monitoring systems according to embodiments may freely set, modify, and delete the monitoring area even after the robot safety monitoring systems are initially installed, and thus may flexibly deal with changes in the work environment.

Furthermore, in the robot safety monitoring systems according to embodiments, when any one of first and second cameras arranged in a T shape is damaged, only one of the two cameras rather than the entire first and second cameras may be selectively replaced, such that repair and replacement may be easy and improved economic efficiency may be provided.

As is traditional in the field, embodiments may be described and illustrated in terms of blocks, as shown in the drawings, which carry out a described function or functions. These blocks, for example, the processor 200 or each of the image processor 210 and the robot controller 220 included in the processor 200, as shown in FIGS. 8 and 9, may be physically implemented by analog and/or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like.

The effects of the disclosure are not limited to the above-mentioned effects, and other effects not mentioned will be clearly understood by a person skilled in the art from the accompanying claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A robot safety monitoring system, comprising:
a stereo camera set configured to photograph a robot and a monitoring area around the robot; and
a processor connected to the stereo camera set,
wherein the stereo camera set comprises:
 a first camera extending in a second direction and comprising a plurality of first camera modules spaced apart from each other in the second direction; and
 a second camera extending in a third direction perpendicular to the second direction and comprising a plurality of second camera modules spaced apart from each other in the third direction,
wherein, based on a first direction, the first camera and the second camera have different fields of view, and
wherein the processor is configured to:
 set the monitoring area,
 determine whether an object is present in the monitoring area, and
 control the robot based on determining that an object is present in the monitoring area, and
wherein the first camera and the second camera are arranged in a T-shape such that a first axis extending in the second direction that intersects a midpoint of the first camera along the third direction is perpendicular to a second axis extending in the third direction that intersects a midpoint of the second camera along the second direction.

2. The robot safety monitoring system of claim 1, wherein the plurality of first camera modules and the plurality of second camera modules have the same diagonal field of view.

3. The robot safety monitoring system of claim 1, wherein a first interval between the plurality of first camera modules is greater than a second interval between one of the plurality of first camera modules and one of the plurality of second camera modules that is closest to the one of the plurality of first camera modules.

4. The robot safety monitoring system of claim 3, wherein the second interval is about 50% to about 95% of the first interval.

5. The robot safety monitoring system of claim 1, wherein the plurality of first camera modules and the plurality of second camera modules have the same horizontal field of view and the same vertical field of view.

6. The robot safety monitoring system of claim 5, wherein the horizontal field of view is about 1.2 times to about 3 times the vertical field of view.

7. The robot safety monitoring system of claim 1, wherein the processor comprises:
an image processor configured to:
match images obtained by the plurality of first camera modules and the plurality of second camera modules, and
obtain detection information of an object based on a result of the matching; and
a robot controller configured to
determine a presence or an absence of an object in the monitoring area, and
control the robot.

8. The robot safety monitoring system of claim 1, wherein the stereo camera set is provided above the robot in a direction facing the robot.

9. The robot safety monitoring system of claim 1, wherein the monitoring area comprises a warning area, a danger area, and an object area.

10. The robot safety monitoring system of claim 9, wherein the warning area comprises the danger area and the object area, and
wherein, based on an object being present in an area other than the object area among the warning area, the processor is further configured to decrease a driving speed of the robot.

11. The robot safety monitoring system of claim 9, wherein the warning area comprises the danger area and the object area, and
wherein, based on an object being present in an area other than the object area, the processor is further configured to stop the robot from moving.

12. The robot safety monitoring system of claim 1, wherein the first camera and the second camera are arranged to cross each other.

13. A robot safety monitoring method comprising:
setting a robot and a monitoring area around the robot;
determining, by a stereo camera set, a presence or an absence of an object in the monitoring area; and
controlling the robot according to the presence or the absence of an object,
wherein the stereo camera set comprises:
a first camera comprising a plurality of first camera modules spaced apart from each other; and
a second camera comprising a plurality of second camera modules spaced apart from each other,
wherein, based on a first direction, the first camera and the second camera have different fields of view, and
wherein the plurality of first camera modules and the plurality of second camera modules have the same diagonal field of view.

14. The robot safety monitoring method of claim 13, wherein the monitoring area comprises a warning area, a danger area, and an object area, and
wherein the method further comprises setting, modifying and deleting each of the warning area, the danger area, and the object area.

15. The robot safety monitoring method of claim 13, further comprising, prior to the determining of the presence or the absence of an object:
matching images obtained through the stereo camera set, and
obtaining detection information of an object based on a result of the matching.

16. A robot safety monitoring system, comprising:
a stereo camera set comprising a first camera extending in a first direction and a second camera extending in a second direction, the stereo camera set being configured to photograph a robot and a monitoring area corresponding to the robot; and
a processor configured to:
set the monitoring area;
determine whether an object is present in the monitoring area; and
control the robot based on determining that an object is present in the monitoring area,
wherein the first camera and the second camera are arranged in a T-shape such that a first axis extending in the first direction that intersects a midpoint of the first camera along the second direction is perpendicular to a second axis extending in the second direction that intersects a midpoint of the second camera along the first direction.

17. The robot safety monitoring system of claim 16, wherein the first camera comprises a plurality of first camera modules; and
wherein the second camera comprises a plurality of second camera modules.

18. The robot safety monitoring system of claim 16, wherein the first camera and the second camera have different fields of view in third direction.

19. The robot safety monitoring system of claim 16, wherein the processor is further configured to:
match images obtained by the first camera and the second camera;
obtain detection information of an object based on a result of the matching; and
control the robot based on the detection information.

* * * * *